March 12, 1957     A. S. DINSMORE     2,784,977

MULTIPLE JAW CHUCK WITH COUNTERBALANCED JAWS

Filed June 15, 1955     2 Sheets-Sheet 1

*INVENTOR.*
ARTHUR S. DINSMORE.
BY
*Chas. T. Hawley*

ATT'Y.

March 12, 1957  A. S. DINSMORE  2,784,977
MULTIPLE JAW CHUCK WITH COUNTERBALANCED JAWS
Filed June 15, 1955  2 Sheets-Sheet 2

*INVENTOR.*
ARTHUR S. DINSMORE.
BY
Chas. T. Hawley
ATT'Y.

United States Patent Office 2,784,977
Patented Mar. 12, 1957

2,784,977

MULTIPLE JAW CHUCK WITH COUNTER-BALANCED JAWS

Arthur Sumner Dinsmore, Seneca Falls, N. Y., assignor to Seneca Falls Machine Company, Seneca Falls, N. Y., a corporation of Massachusetts Application June 15, 1955, Serial No. 515,575

3 Claims. (Cl. 279—106)

This invention relates to multiple jaw chucks particularly designed for driving workpieces in lathes on in other similar machine tools.

An important object of the invention is to provide a multiple jaw chuck in which the action of centrifugal force on the jaws is effectively counterbalanced at any desired speed of rotation.

A further object is to provide a multiple jaw chuck in which the jaws are simultaneously operated through non-reversible helical gearing.

The invention further relates to arrangements and combinations of parts which will be hereinafter described and more particularly pointed out in the appended claims.

A preferred form of the invention is shown in the drawings, in which

Figure 1:
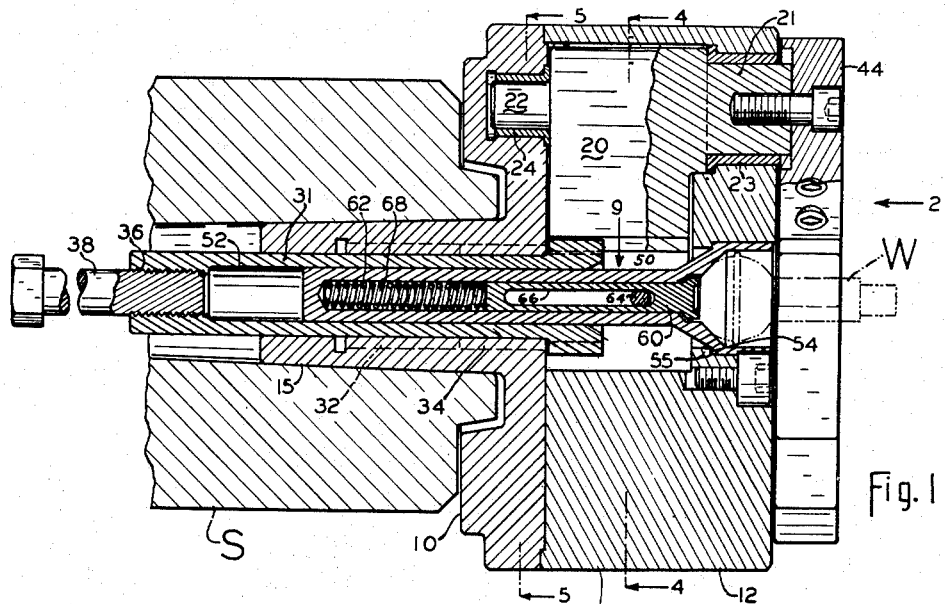
Fig. 1 is a sectional side elevation of this improved chuck.
Figure 4:
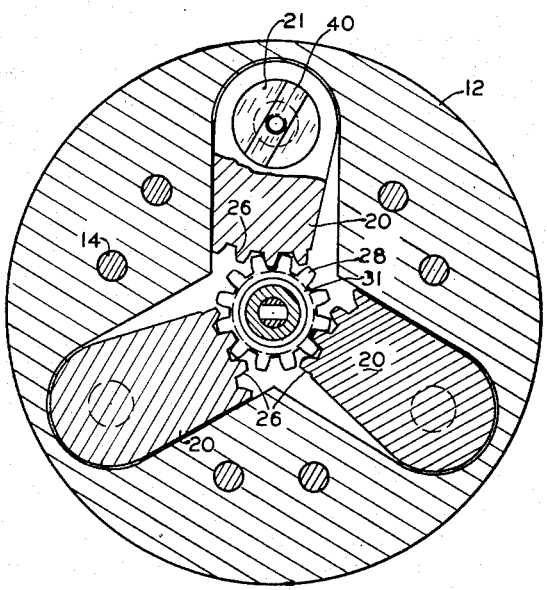
Figure 5:
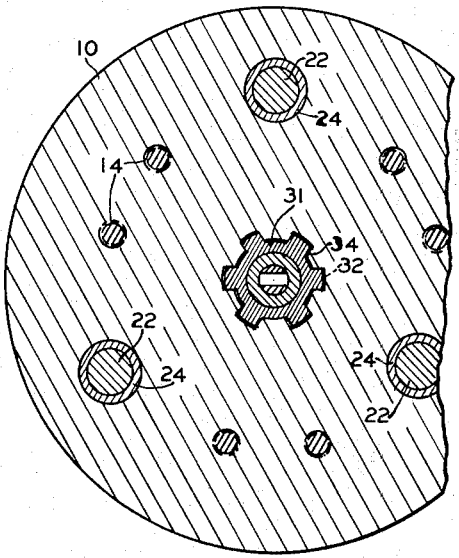
Figure 7:
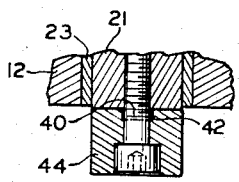
Figure 6:
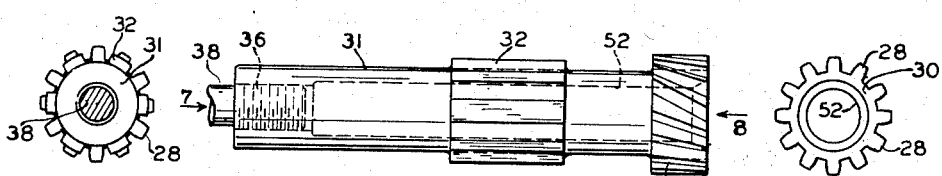
Figure 8:
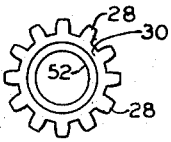
Figure 9:
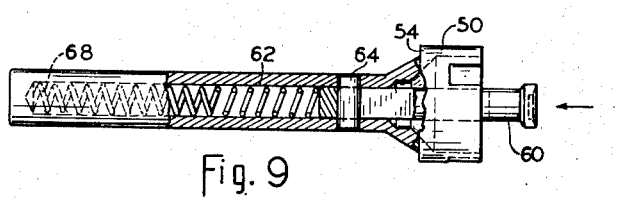
Figure 10:
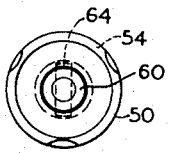

Figs. 4 and 5 are transverse sectional elevations, taken along the lines 4—4 and 5—5 in Fig. 1;

Fig. 6 is a side elevation of the jaw-closing helical pinion;

Figs. 7 and 8 are left and right-hand end elevations thereof, looking in the directions of the arrows 7 and 8 in Fig. 6;

Fig. 9 is a side elevation, partly in section, of a work-positioning and ejecting device to be described and looking in the direction of the arrow 9 in Fig. 1;

Fig. 10 is a right-hand end elevation thereof; and

Figure 2:
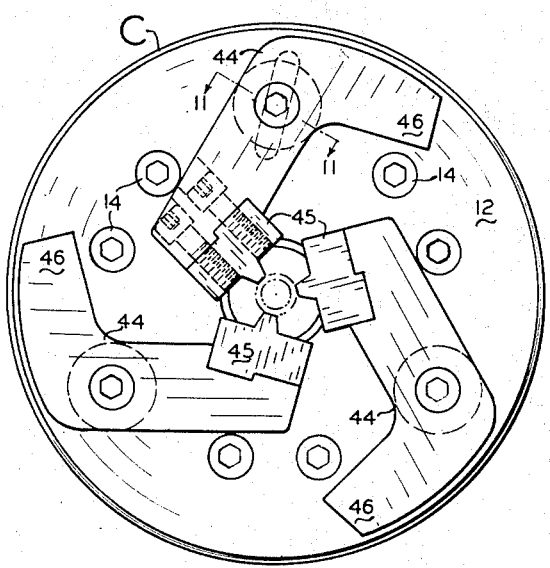
Fig. 2 is a front end elevation thereof with the jaws closed on the work.
Figure 11:
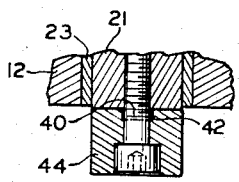

Fig. 11 is a detail sectional view, taken along the line 11—11 in Fig. 2.

Referring to the drawings, this improved chuck C is shown as mounted on a rotated spindle S. The chuck comprises a back plate 10 and a combined body portion and front plate 12 which are secured in assembled relation by a plurality of screws 14 (Figs. 2 and 4). The back plate 10 has a tapered shank 15 and is firmly supported on the outer end of the spindle S.

Segmental gears 20 are provided with bearing portions 21 and 22 (Fig. 1) rotatably mounted in bushings 23 and 24, which in turn are seated in the front plate 12 and back plate 10 respectively.

Each segmental gear 20 is provided with helical gear teeth 26 at its inner end, as shown in Fig. 4. These teeth 26 engage the corresponding helical gear teeth 28 of a helical pinion 30 (Fig. 6) formed at one end of a short shaft 31. The shaft 31 has a plurality of splines 32 slidable in corresponding keyways or grooves 34 indicated in Figs. 1 and 5 and formed in the shank portion 15 of the back plate 10.

The left-hand end of the shaft 31 is internally threaded as indicated at 36 (Fig. 6) to receive the correspondingly threaded end of an actuating rod 38 (Fig. 1). Any usual means may be provided for moving the rod 38 to open and close the chuck as desired.

Endwise movement of the shaft 31 and pinion 30 will obviously cause angular movement of the segmental gears 20, as the splines 32 prevent relative rotation of the shaft 31 and the chuck plates 10 and 12.

At its outer end, the bearing portion 21 of each lateral gear 20 is provided with an integral cross spline 40 (Fig. 11) which is received in a correponding slot or keyway 42 in the supporting end of a jaw 44. All of the jaws 44 are thus designed to be moved angularly by the pinion 30, and such movement takes place about the axis of the bearing portions 21 and 22.

At their inner ends, the jaws 44 are provided with work-engaging blocks 45, and at their outer ends each jaw 44 is provided with an offset counterweight portion 46.

It will be noted that when the chuck is in rapid rotation, the effect of centrifugal force on the counterweight portions 46 will substantially offset the effect of centrifugal force on the work-engaging blocks 45 and the adjacent portions of the jaws 44, so that the tendency of the chuck to open or loosen at high speed is substantially eliminated.

A work-centering member 50 is inserted in an axial opening 52 (Figs. 6 and 8) in the shaft 31, and the member 50 is provided with an outer shoulder 54 (Fig. 1) engaging a shouldered recess 55 in the front plate 12.

The outer end of the member 50 is shown as adapted to receive and center the spherical end of a workpiece W. An ejector 60 is slidable in an axial opening 62 in the member 50 and is held in assembled relation therewith by a cross-key 64. Endwise motion of the ejector is permitted by an elongated slot 66 in the ejector, and the ejector is pushed outward by a coil spring 68.

Figure 3:
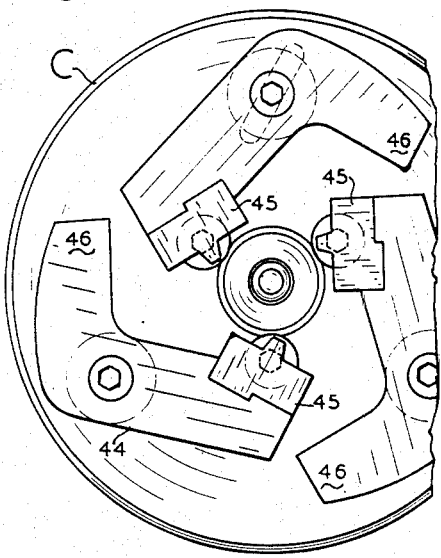
Fig. 3 is a partial front elevation showing the jaws in open position.

When the jaws 44 are moved outward from the holding position shown in Fig. 2 to the open position shown in Fig. 3, the ejector 60 will be pushed outward by the spring 68 and will thus eject the workpiece W.

The coacting angles of the helical teeth of the pinion 30 and the gears 20 are such that this gearing is non-reversible, thus locking the parts securely in holding position.

The provision of the counterweight portions 46 is extremely important, as it has been found exceedingly difficult to keep the movable chuck jaws from outward displacement by centrifugal force, when such chucks are rotated at the very high speeds now prevalent.

Having thus described the invention and the advantages thereof, I do not wish to be limited to the details herein disclosed, otherwise than as set forth in the claims, but what I claim is:

1. A multi-jaw chuck comprising a rotated body, a plurality of work-engaging jaws pivotally mounted in spaced relation on said body, a separate segmental gear mounted to swing with each jaw, and a single axially-movable operating member for all of said segmental gears, and said operating member and segmental gears having engaging and co-acting helical gear teeth.

2. A multi-jaw chuck comprising a rotated body, a plurality of work-engaging jaws pivotally mounted in spaced relation on said body, a separate segmental gear mounted to swing with each jaw, an a single axially-movable operating member for all of said segmental gears, and said operating member and segmental gears having engaging, co-acting and non-reversible helical gear teeth.

3. A multi-jaw chuck comprising a rotated body, a plurality of work-engaging jaws pivotally mounted in spaced relation on said body to swing about axes parallel to the axis of the chuck and each jaw having a counter-balancing portion effective to offset any action of centrifugal force on said jaw, and means to close said jaws simultaneously.

References Cited in the file of this patent

UNITED STATES PATENTS

| | | |
|---|---|---|
| 2,182,614 | Garrison | Dec. 5, 1939 |
| 2,379,091 | Tourneau | June 26, 1945 |
| 2,394,861 | LeTourneau | Feb. 12, 1946 |
| 2,568,088 | Pedersen | Sept. 18, 1951 |
| 2,616,943 | Trudeau | Oct. 14, 1952 |

FOREIGN PATENTS

| | | |
|---|---|---|
| 408,777 | Great Britain | Apr. 19, 1934 |